C. W. FREDERICK.
FOCUSING LENS MOUNT AND METHOD OF ASSEMBLING SAME.
APPLICATION FILED AUG. 18, 1920.

1,394,078.

Patented Oct. 18, 1921.

WITNESSES:
Helen M. Fraser

INVENTOR,
Charles W. Frederick,
BY R. L. Stinchfield
ATTORNEYS.

UNITED STATES PATENT OFFICE.

CHARLES W. FREDERICK, OF ROCHESTER, NEW YORK, ASSIGNOR TO EASTMAN KODAK COMPANY, OF ROCHESTER, NEW YORK, A CORPORATION OF NEW YORK.

FOCUSING LENS-MOUNT AND METHOD OF ASSEMBLING SAME.

1,394,078.     Specification of Letters Patent.     Patented Oct. 18, 1921.

Application filed August 18, 1920. Serial No. 404,396.

*To all whom it may concern:*

Be it known that I, CHARLES W. FREDERICK, a citizen of the United States of America, residing at Rochester, in the county of Monroe and State of New York, have invented certain new and useful Improvements in Focusing Lens-Mounts and Methods of Assembling Same, of which the following is a full, clear, and exact description.

This invention relates to photography, and more particularly to a focusing lens mount in which certain types of lenses may be used to focus the camera by altering the focal length of the lens. This is particularly desirable where the camera has a fixed extension or where it is necessary to use a shutter having a fixed position relative to the focal plane of the camera. One object of my invention is to provide a focusing device with which objects near to or far from the camera can be focused by turning a lens cell on the front of the camera, a further object is to provide a dial with which less than one turn will focus the camera on near or far objects, a still further object is to provide a lens cell in which the relative positions of the lenses can be adjusted when the camera is being assembled, a still further object is to provide a limiting stop for the revoluble lens cell, a further object is to conceal this stop under the revoluble cell, and a still further object is to provide a method by which the lens systems carried by my improved focusing mount can be assembled. Other objects will appear hereinafter from the specification.

In the drawings in which like reference characters denote like parts throughout:

Figure 1:
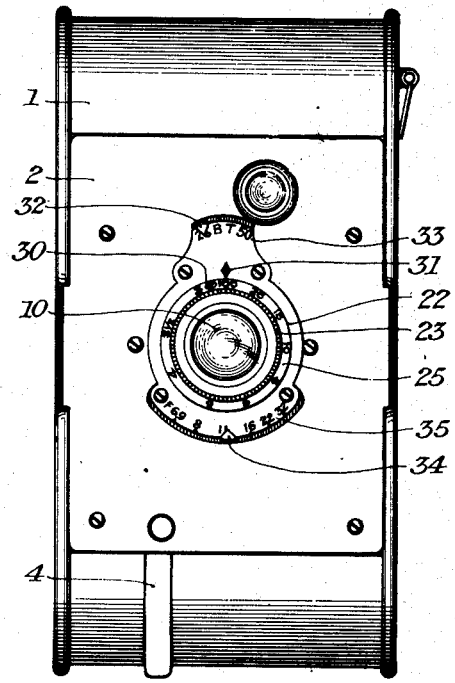
Figure 1 is a front plan of a well known type of camera constructed in accordance with and illustrating one embodiment of my invention.
Figure 2:
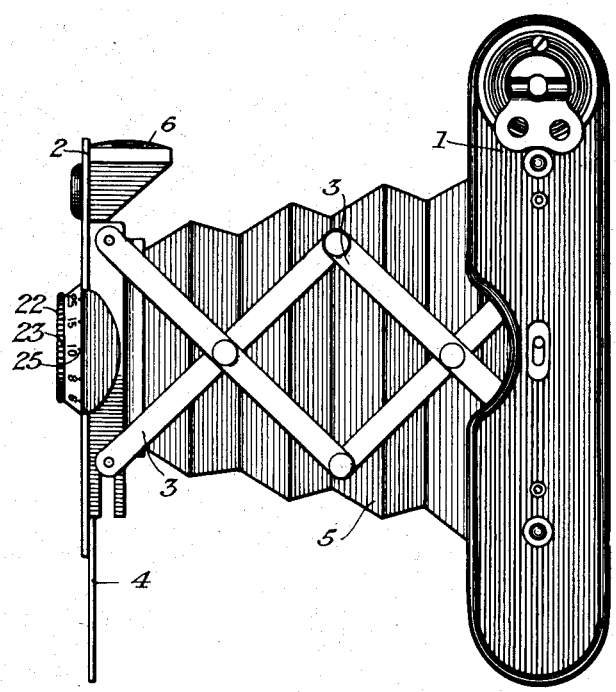
Fig. 2 is a side elevation of the same camera.

In the present embodiment of my invention, as shown in the drawings, the camera body 1 carries a front plate or lens board 2 upon folding side struts 3, so that the relation between the lens board and focal plane of the camera is fixed when the camera is extended. A folding leg 4 supports the camera in an open position. Bellows 5 of the usual collapsible type connect the lens board to the body of the camera, and a finder 6 is attached inside of the front plate. In this type of camera a between-the-lens-shutter 7 is commonly used, and is here illustrated, but the working parts of the shutter are omitted from Fig. 4, only such parts as apply to my invention being shown. I also contemplate the use of this lens mount upon cameras using a focal plane shutter, so that where I refer to a lens tube in the specification I will mean either the well known barrel, usually equipped with an iris diaphragm, or the barrel-like threaded tube of a shutter into which the lens holding parts are screwed.

The complete objective consists of four glass lenses 10, 11, 12 and 13, the last three mentioned being fixed with respect to the mount, designated generally as 14. The rear lenses 12 and 13, separated by a ring 15, are held in a cell 16 which screws into the rear part 17 of the mount 14. Lens 11 is carried by a cell 18 having a threaded connection 19 with the forward part 20 of the mount 14, there being a forwardly extending internally threaded portion 21 for the reception of a movable cell 22. This cell is knurled around the edge 23 for convenience in handling, and a flange 24, extending from the nurling forms a convenient surface upon which a scale 25 is engraved. The flange also leaves an opening from the back, or a groove, into which a stop, which will be hereinafter described, is concealed, and provides a dust guard over the screw connection 21. It should be noted that the knurled portion 23 extends out beyond the edge of the beveled surface or flange 24, this construction being used so that sky-filters, color screens, or other supplementary lenses in cells can be placed on and be held by the knurled portion of the movable mount 22. Such attachments are well known to those familiar with cameras and no further description of them is therefore necessary. A ring 25' holds the front lens 10, and can be adjusted in cell 22 through the threaded portion 26 to and from the other lenses.

The shutter cover plate 27, here shown as lying under the scale plate 28, forms the forward section 19 of the mount 14, and a lug 29 is struck from this metal plate so as to extend forwardly therefrom into the groove underlying flange 24. A screw 30 passing through flange 24 forms a stop by striking lug 29, limiting the travel of cell 22 and preventing its being unscrewed and separated from the barrel. By turning cell 22 the camera may be focused by bringing the desired distance mark on the scale 25 opposite to an arrow or pointer 31 upon the scale plate 28. The shutter speeds can be controlled by the usual pointer 32 operating over scale 33, while the diaphragm pointer 34 coöperates with scale 35 to vary the light admitted through the lens. When a shutter is not used, the lug 29 can readily be formed by extending a portion of the barrel.

To get the best results the several lenses must be very accurately spaced. Since the actual focal lengths of lenses manufactured for the same focal length are liable to vary, some method of compensating and adjusting for these variations is necessary. I therefore prefer to proceed in assembling my device as follows: Lenses 11, 12 and 13 are first placed in the lens mount 14, and cell 22 is screwed in until it is seated and comes to a stop. At this point a mark is made on cell 22 after allowing a small part of a revolution, say ten to twenty degrees back from its seated position, so that when finally assembled it will revolve freely and not tend to tighten at one limit of its movement. The cell is then removed and is drilled and tapped for the stop pin 30, and, in the form shown in the drawings, is engraved with a distance or focusing scale, locating the units of distance from the mark previously made. The focal distances shown in this case are 3, 3½, 4, 5, 6, 8, 10, 15, 25 and 100 feet, so that a large variety of subjects can be successfully focused. After engraving and drilling, lens 10 in the cell 25' is placed in cell 22, and this lens element is again screwed on the threaded connection 21. The limiting stop 30 can be placed in position, after seating mount 22 and turning it backward a portion of a turn so that pin 30 will come on the left side of lug 29. Selecting a convenient focal unit, say twenty-five feet, the mount 22 is revolved until the arrow 31 points to the numeral 25, after which lens 10 is moved in its cell 25' until the image is sharply in focus upon the focal plane of the camera. The lens cell is fastened in this position by a little shellac on the threads 26, or by deforming the threads by a punch or otherwise, so that the lens 10 will turn with the lens mount 22. All of the remaining focal units indicated on the scale will be correct, as the distances between the units are carefully coördinated with the pitch of threads 21, giving accurate focal distances. A convenient system is, as shown in the drawings, to place stop pin 30 in such a position that the 100 foot mark is opposite the arrow 31 where the stop rests against the left side of lug 29 (facing the camera) and the 3 foot mark when on the right side of lug 29.

Figure 3:
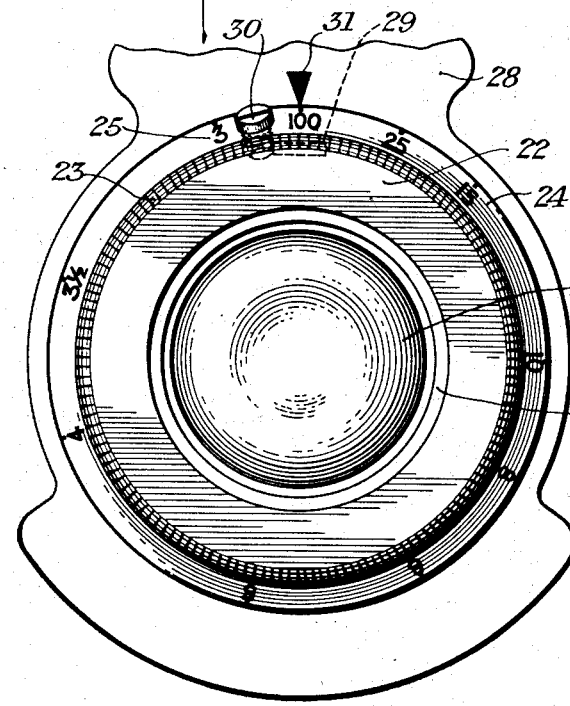
Fig. 3 is an enlarged fragmentary elevation of the lens mount.
Figure 4:
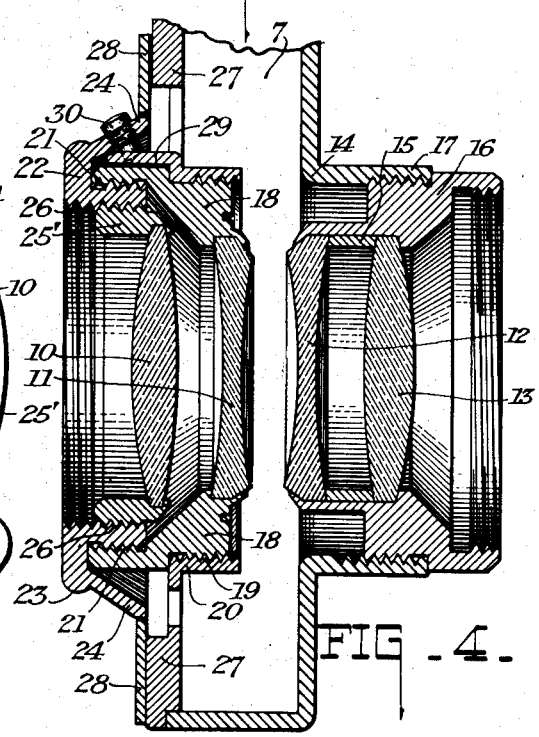
Fig. 4 is a cross section through the lens mount, the shutter parts being omitted for clearness.

In Fig. 1 I have indicated the outline of the head of screw 30, which is a flat headed screw, but in practice this screw head can easily be concealed after placing in position by filling the slot with black wax, cement, or with any other desirable material. This prevents the used from tampering with or altering the adjustments, which must necessarily be carefully made, so that the instrument is less liable to get out of order when the screw is so concealed. In Figs. 3 and 4, screw 30 is shown as a headed screw which, of course, may be used if desired.

From the above description it will be seen that I have provided a very simple and efficient focusing lens mount, and that obviously certain changes can be made from the embodiment shown in the drawings without departing from the spirit of my invention.

Having thus described my invention what I claim as new and desire to secure by Letters Patent is:

1. In a focusing device for cameras, the combination with a barrel holding three lenses of a four lens system, of a movable mount, a fourth lens carried by the movable mount adjustable to and from the three fixed lenses along the axis thereof, a pointer and a focusing scale, one located on the barrel and the other on the movable mount, and means including a stop for limiting the movement of the movable mount relative to the fixed barrel, the range of focus of the camera being included in the movement of the mount.

2. In a focusing device for cameras, the combination with a lens tube fixed relative to the focal plane of the camera, of a plurality of lenses mounted in a fixed position in the lens tube, a lens mounted to move to and from the fixed lenses, a grooved cell for carrying the movable lens, and coöperating stops in said groove to limit the movement of the movable lens relative to the fixed lenses.

3. In a focusing device for cameras, the combination with a lens tube fixed relative to the focal plane of a camera, of a plurality of lenses mounted fixedly in said lens tube, a movable lens, a revoluble mount for adjusting the movable lens to and from the fixed lens, an overhanging flange on the revoluble mount, and coöperating stops one carried by the lens tube and the other by the revoluble lens mount for limiting the movement of the revoluble cell, said coöperating stops being concealed under said overhanging flange.

4. In a focusing device for cameras, the combination with a lens tube fixed relative to the focal plane of a camera, of a plurality of lenses carried by the fixed tube, a revoluble mount, a lens carried by the revoluble mount, an overhanging flange on the revoluble mount, there being a focusing scale carried by the outside of the flange and a stop projecting inwardly from the flange.

5. In a focusing device for cameras, the combination with a lens tube fixed relative to the focal plane of a camera, of a plurality of lenses carried by the fixed tube, a revoluble mount, a lens carried by the revoluble mount, an overhanging flange on the revoluble mount, a stop projecting from the overhanging flange, and a lug projecting from the fixed lens tube, the stop and the lug coöperating to limit the movement of the revoluble mount.

6. In a focusing device for cameras, the combination with a lens tube fixed relative to the focal plane of a camera, of a plurality of lenses carried by the fixed tube, a revoluble mount, a lens carried by the revoluble mount, an overhanging flange on the revoluble mount, a stop projecting from the overhanging flange, and a lug projecting from the fixed lens tube, the stop and the lug being located beneath and concealed by the overhanging flange, so as to limit the movement of the revoluble mount.

7. In a focusing device for cameras, the combination with a lens barrel, three lenses of a four lens system carried in fixed relation in the lens barrel, a fixed threaded socket in the lens barrel, a movable mount for the fourth lens, a threaded portion adapted to screw into the fixed threaded socket, a flange on the movable mount overlying the threaded socket, and a lug extending between the threaded socket and the flange adapted to limit the rotation of the movable mount by coöperating with a protuberance on the overhanging flange.

8. The method of assembling a focusing lens mount which consists in placing three lenses in fixed relation in a barrel, screwing a revoluble mount on the barrel until it is seated therein, marking the mount, removing the mount and graduating it into units of focal distances, locating said graduations from said mark on the mount, replacing the mount on the barrel, and finally focusing the lens upon a unit distance by adjusting a cell carrying a fourth lens relative to the revoluble mount.

9. The method of assembling a focusing lens mount comprising the following steps: first, seating a movable lens mount upon the end of a lens barrel in which a plurality of lenses are held in fixed relation to each other; second, marking the seated mount, and removing it from the barrel; third, marking focusing data upon the mount locating said data from the first marking, and also locating a stop upon said mount from said first marking; fourth, reseating the mount and placing a fourth lens carried by a lens cell in the mount; fifth, focusing the lens on the camera by trial, using any unit distance and moving the fourth lens relative to the mount until the image is sharp for the unit distance used; and sixth, fastening the fourth lens cell against movement in the movable focusing mount, and placing a stop at the predetermined position.

10. The method of assembling a focusing mount which comprises assembling three lenses of a four lens system in a barrel, and adjusting a focusing scale and a pointer relative to each other on the lens barrel and on a revoluuble mount, placing the fourth lens in the revoluble mount, and adjusting it relative to said mount until an object at a focal unit from the camera is in sharp focus upon the focal plane of the camera, and fastening the fourth lens in the revoluble mount at the position thus found.

Signed at Rochester, New York, this 12th day of Aug., 1920.

CHARLES W. FREDERICK.